Oct. 18, 1932.  I. A. WEAVER  1,883,180
VEHICLE WHEEL TESTING APPLIANCE
Filed July 13, 1929  5 Sheets-Sheet 1

Inventor
Ira A. Weaver
By Walter M. Fuller
Atty

Oct. 18, 1932.   I. A. WEAVER   1,883,180
VEHICLE WHEEL TESTING APPLIANCE
Filed July 13, 1929   5 Sheets-Sheet 3

Oct. 18, 1932.  I. A. WEAVER  1,883,180
VEHICLE WHEEL TESTING APPLIANCE
Filed July 13, 1929   5 Sheets-Sheet 4

Inventor
Ira A. Weaver
By Walter M. Fuller Atty

Oct. 18, 1932.　　　I. A. WEAVER　　　1,883,180
VEHICLE WHEEL TESTING APPLIANCE
Filed July 13, 1929　　　5 Sheets-Sheet 5

Patented Oct. 18, 1932

1,883,180

UNITED STATES PATENT OFFICE

IRA A. WEAVER, OF SPRINGFIELD, ILLINOIS, ASSIGNOR TO WEAVER MANUFACTURING COMPANY, OF SPRINGFIELD, ILLINOIS, A CORPORATION OF ILLINOIS

VEHICLE WHEEL TESTING APPLIANCE

Application filed July 13, 1929. Serial No. 378,007.

My invention relates to appliances for testing vehicle-wheels both as to their alignment or inward or outward toe, and as to their braking capacities when the brakes are applied to their drums.

An object of the invention is to provide an apparatus of this character which is composed of a few parts, which reliably and effectively performs its functions, which can be economically manufactured, which is unlikely to become damaged or injured in ordinary service and which gives one or more indications or records of the condition of the wheels as to their properties with respect to alignment and the adjustment of their brakes.

Various other advantages, accruing from the employment of the new invention, will become apparent to those skilled in this art from a consideration of the following detailed description of a present preferred embodiment of the invention, illustrated in the accompanying drawings, forming a part of this specification, and throughout the several views of which like reference numerals have been employed to designate the same parts.

Referring to these drawings, it will be noted that the improved and novel appliance includes a pair of spaced, parallel base-plates 21, 21, cross-connected together near one end by a flat, transverse bar or plate 22 and near their middle portions by a second, wider bar or plate section 23, the frame, composed of such members, being intended to rest on the floor or ground in any suitable position so that the automobile, the wheels of which are to be tested, may be readily driven over the apparatus.

Each such plate 21 has a rectangular, angle-bar frame 24, riveted or otherwise fastened to its upper surface, and a pair of flat, parallel, spaced tracks 25, 25, are similarly riveted on, and disposed longitudinally of, the top of each base plate just inside of the lengthwise parts of the frame 24, such tracks having a relatively large number of anti-friction balls 26, 26, designed to roll thereon and accommodated in recesses or apertures of a suitable right-angled ball-cage 27, through the top and bottom surfaces of which the balls project, such shiftable cage and its balls being yieldingly held in normal, neutral position by a pair of obliquely-disposed, coiled springs 28, 28, connected to each end of the cage and to a pair of posts 29, 29, on the base-plate.

Each member 21 has a cover or traction plate 31 fitted with tracks 34, 34, secured on its under surface riding on the two, separated groups of underlying balls, such plate 31 having depending, marginal or border flanges 32, 33, located beyond and overlapping the upstanding flanges of the longitudinal, anglebar elements of the frame 24, such construction effectively excluding objectionable foreign matter from the space between the upper and lower plates.

Two, apertured or recessed blocks 35, 35, each fitted with an anti-friction roller 36, are fastened to the top of each base-plate 21, and a longitudinally-arranged bar 37 bears at its opposite straight ends on such pair of rollers, thus precluding lengthwise movement of the specified bar, each such bar, at about the middle of its length, having a comparatively-long lateral extension or arm 38, the function of which is presented hereinafter.

A pair of stop or abutment blocks 41, 41, spaced lengthwise each base-plate, are fixed to the bar 37, and a pair of cross-bars 42, 42, connected together at their ends by a couple of coiled, contractile springs 43, 43, are designed and adapted to cooperate with their outer faces, the corresponding upper or traction plate 31 having secured against its undersurface a plate 45 with parallel, downwardly-bent flanges 44, 44, on opposite sides of the bar 37 and of the same length as the distance between the outer faces of the stop-blocks 41, 41.

It will, therefore, be apparent that, if the top plat 31 is shifted lengthwise in either direction, such travel will be in opposition to the action of its springs 43, 43, the one bar 42 moving in either instance and the companion element 42 being held against travel by bearing against the adjacent stop-block 41.

Figure 3:
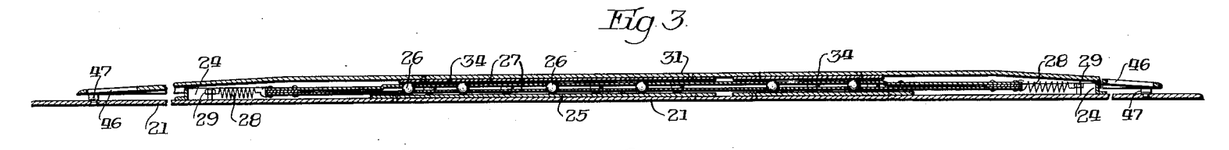
Figure 3 is a longitudinal, vertical section on line 3—3 of Figure 2.
Figure 4:
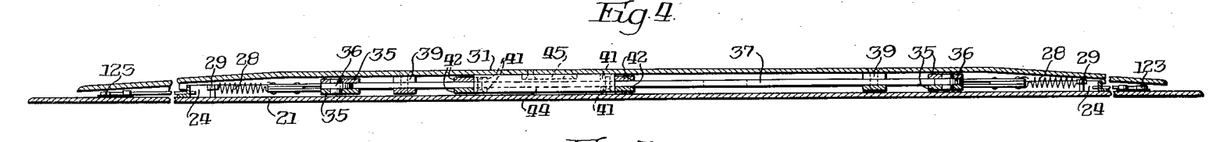
Figure 4 is a similar, lengthwise, vertical section on line 4—4 of Figure 2.

It will be observed, that the opposite end portions of each plate 31 slopes downwardly (see Fig. 3) to facilitate the rolling of the vehicle-wheel to be tested up on to its main, central part, and such terminal sections of such plates are intended to bend down slightly when the weight of the automobile is imposed on them for a purpose hereinafter more fully set forth.

To assist in maintaining the plates in proper position or correct location, each end of each plate has a pair of parallel slots 46, 46, with downwardly flaring side walls adapted to fit over stationary, similarly-tapered registering lugs or projections 47, 47 mounted on the base-plate 21 beneath.

Hence, when such part of the plate bends down it is automatically centered, such portion of the plate springing up again due to its own inherent resiliency just as soon as the wheel passes over it.

These slots and lugs assist the recording mechanism to zero and prevent shift of the plates should the car approach them at a slight angle or if the steering mechanism be moved slightly while the wheels are in contact with the plates.

Each plate 31 has two longitudinally and transversely spaced lugs 51 and 52 projecting down from it and cooperating with anti-friction rollers on the ends of two arms of a three-arm lever 53 fulcrumed on the cross-piece 23 at 54.

The third arm of one such lever 53 is connected to a coiled, contractile spring 55 fastened to a pin on the cross-member 23, whereby the lever 53 is always held with its two rollers in engagement with their associated plate-lugs 51 and 52, such third arm also being joined by a link 56 to a short lever 57 fulcrumed on the cross base element 23, the lever, on the opposite side of its fulcrum pin, being joined to a long link 58.

In similar manner, the third arm of the other or companion lever 53 is connected to a spring 55 for the same purpose and to a longer bent link 59.

Figure 2:
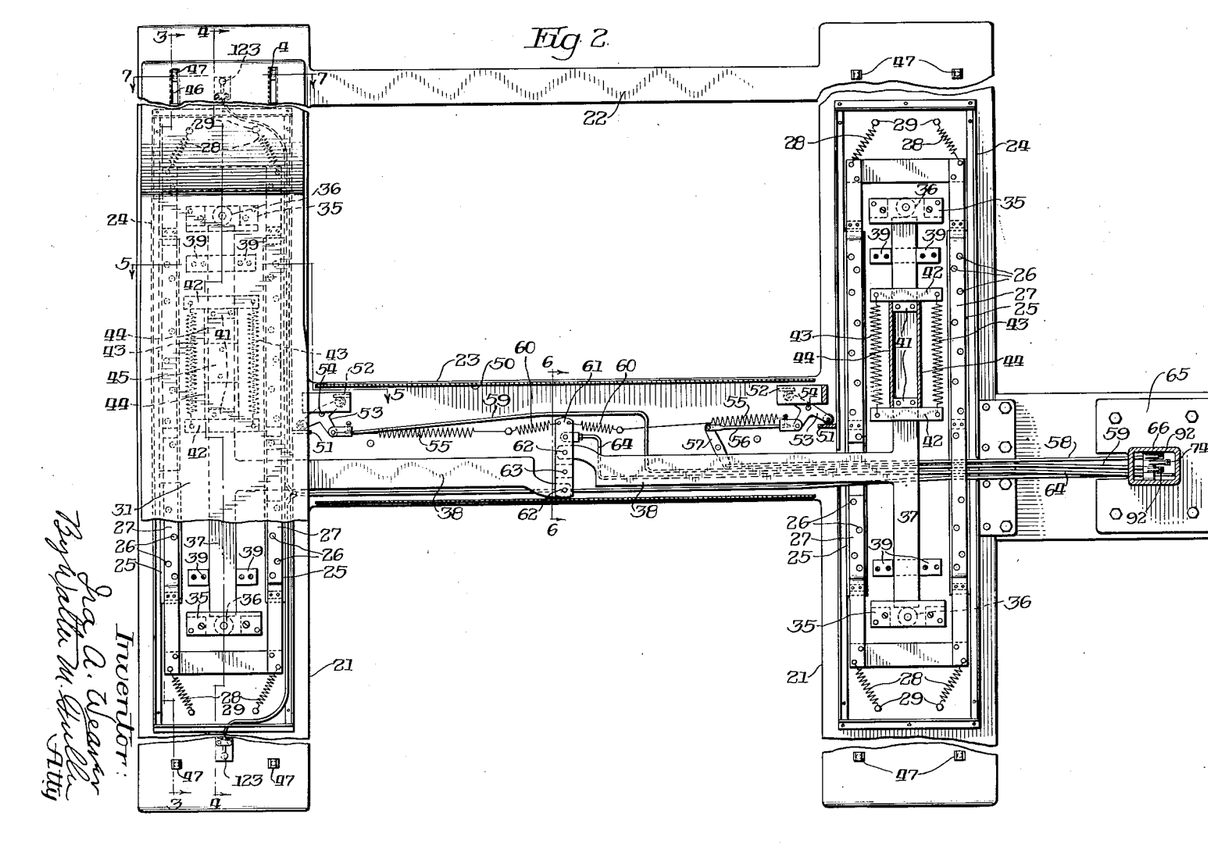
Figure 2 is a partial plan view and partial horizontal section of the appliance with portions broken away.

From the foregoing it will be clear that, regardless of the lengthwise direction of movement of either plate 31, the corresponding link 58 or 59, as the case may be, will be shifted toward the observer as the parts are viewed in Figure 2, that is to say, away from the column carrying the indicating mechanism.

The inwardly-directed arms or extensions 38, 38 of the two bars 37, 37, are pivotally connected at 62, 62 to an equalizing lever 61 on opposite sides of, and at equal distances from, the fulcrum pin 63 of such lever on the base element 23, a pair of coiled springs 60, 60, connected to the lever and to stationary pins on the base, normally maintaining lever 61 in central or neutral position, the lever having a bent link 64 hingedly connected thereto, as is clearly depicted in Figure 2.

The part 23 of the underlying frame and the mechanical elements which it carries are protected from injury and dirt by an appropriate cover-plate 50 having marginal flanges of the usual type.

Figures 1, 14, 15:
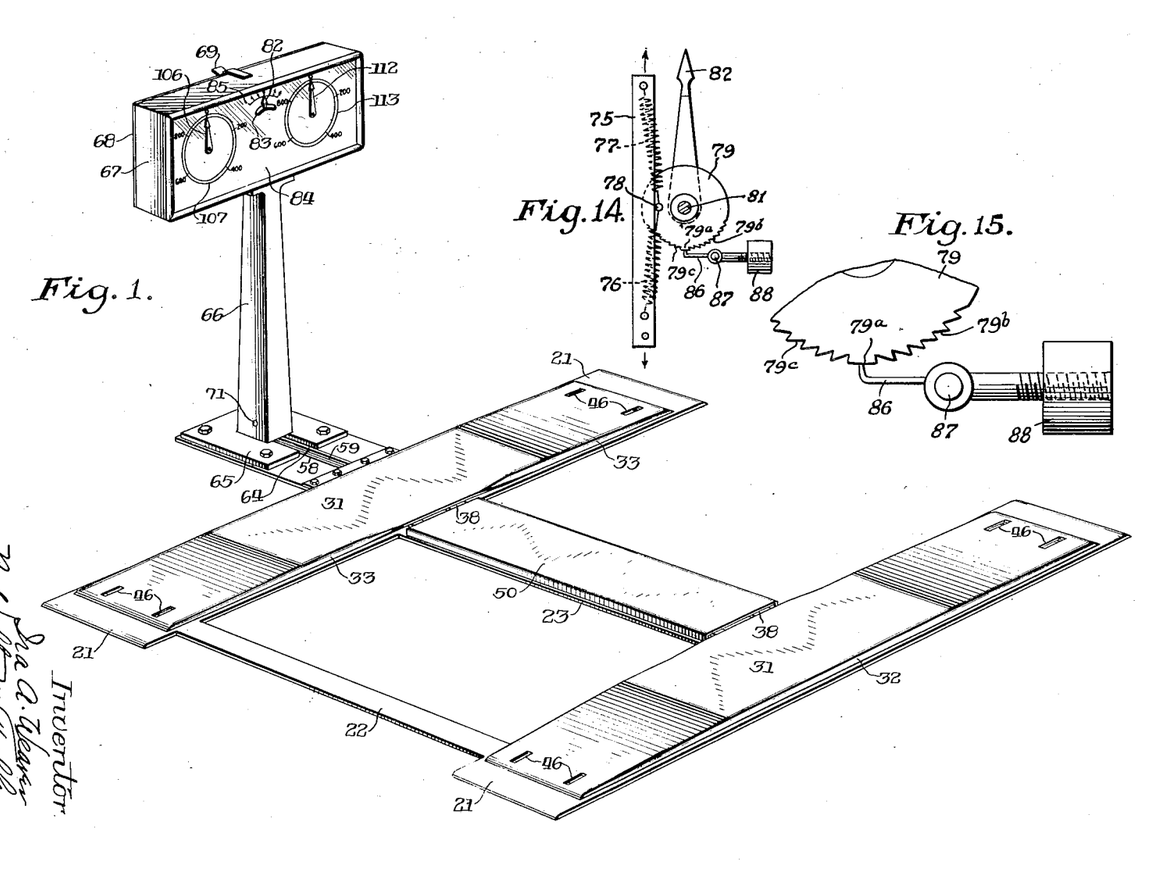
Figure 1 is a perspective view of the entire apparatus.
Figure 14 is an enlarged view of a portion of the wheel-alignment indicating mechanism.
Figure 15 is an enlarged, fragmentary view of a part of such mechanism.
Figures 10, 11, 12:
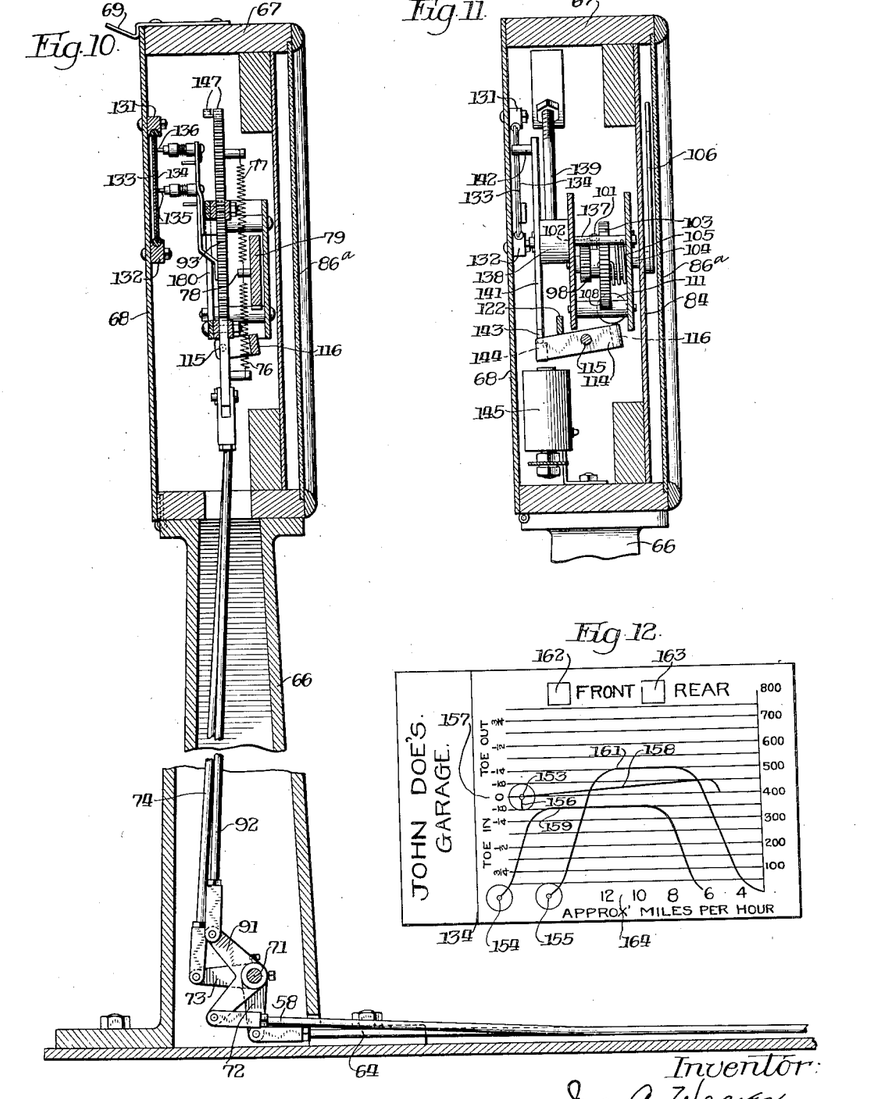
Figure 10 is a vertical section through the upright standard and its supported casing on line 10—10 of Figure 8.
Figure 11 is a vertical section through the casing on line 11—11 of Figure 8.
Figure 12 is a face view of one of the charts adapted to be drawn by the appliance to visually depict the condition of the alignment of the vehicle wheels and the adjustment of their brakes.

As provided in Figures 1 and 10, the apparatus, at one side of the mechanical parts already described, has a base 65 in register with the base-frame member 23, from which rises a hollow column or standard 66 carrying a casing 67 at its upper end fitted with a hinged, downwardly-opening door 68 cooperating with a holding clasp 69.

Referring to Figure 10, it will be observed that a shaft 71, rockingly mounted in appropriate bearings in the lower portion of the standard, has a depending arm 72 fixed thereto connected to the remaining end of the link 64, another arm 73, fixed to and hence rockable with the shaft, being operatively joined by an upright link 74, (Figures 8 and 10), to a suitably-guided, vertically-reciprocatory bar or slide 75 inside of the casing 67, lower and upper springs 76 and 77, respectively, being fastened to lugs on and near the bottom and top ends of the slide, the other adjacent ends of the springs being connected to a pin 78, (Figures 8 and 9), mounted on a ratchet-wheel 79 pinned to a shaft 81 rockable in bearings in a frame inside of the casing 67 and composed in part of a pair of parallel supporting plates 80 and 180.

As is shown most clearly in Figs. 14 and 15, the ratchet-wheel 79 has a broad, flat-top tooth 79a and on opposite sides of this are right and left hand ratchet-teeth 79b and 79c.

In front of such plate 80, the protruding part of the shaft has the lower end of a wheel-alignment pointer or index 82 fixed to and turnable with it, such pointer being bent and extended forwardly through a curved slot 83 in a plate or sheet 84 in the front part of the casing and having a suitable set of curved graduations 85 on its display face, such scale marks being numbered in both directions from a central 0, the casing desirably being fitted with a glass or window 86a, encasing such pointer and its associated scale.

From what precedes, it will be apparent that if one or both of the vehicle-wheels, which simultaneously roll along on the pair of traction plates 31, 31, toe in or toe out, they will cause such plates to shift sidewise corresponding to the direction and amount of the in or out toe, and the plates through the members 39, 39, shift the bars 37, 37, in like manner, with a resulting rocking of the equalizer lever 61, which movement is transmitted through the associated elements 64, 72, 71, 73, 74, 75, 76 or 77, 78, 79 and 81 to the pointer 82, the amount of turning of which is indicated by the scale 85, thus giving visible evidence of the correct or improper alignment of the wheels undergoing the test.

A pawl 86, coacting with the ratchet-wheel 79, is fulcrumed at 87 and its tail has a weight 88 thereon, tending to keep the pawl in engagement with the teeth of the ratchet-wheel, such coacting members retaining the needle or pointer 82 in its indicating position until its restoration to its normal central position is permitted by means hereinafter set forth.

Normally pawl 86 bears on the broad tooth 79a of ratchet-wheel 79, but as the latter is turned in either direction by reason of the travel of bar 75, which movement is transmitted to the ratchet-wheel by the spring 76 or 77, as the case may be, it will co-act with the one or the other set of ratchet-teeth 79b or 79c to hold the ratchet-wheel and its associated pointer 82 in its moved position until restoration is permitted by release of the pawl in a manner as will be shortly indicated.

The appliance also has means in the casing 67 for showing the individual lengthwise movements of the two traction plates 31 when the vehicle-wheels are run over them and their brakes are applied, whereby to indicate the braking forces applied by the brakes to denote whether the latter are properly adjusted or whether either one or both requires regulation or adjustment.

Inasmuch as these two mechanisms are substantially alike a full description of one will practically suffice for both.

Assuming that we consider the plate 31 nearest to the standard 66, its link 58 is connected to one arm of a bell-crank lever 91, (of which there are two alike) (Figure 10), rockingly mounted on shaft 71, the other arm of such lever being joined by a link 92 to a vertically slidable rack 93, the teeth of which are in mesh with a pinion 94 of a set of appropriately-mounted intermeshing gears 95, 96, 97, 98. the latter being revoluble on a shaft 104 having bearings in the plates 80 and 180, the hub of such gear 98 being fitted with an upstanding pin 101 adapted to contact with a companion pin 102 projecting from the side of a ratchet-wheel 103 fixed to the shaft 104 on which the gear 98 loosely turns, a torsion spring 105, connected to the ratchet-wheel and to the plate 80, tending to rock the shaft 104 in one direction.

Such shaft, in front of the plate 84, has a pointer 106 fixed to and turnable with it, such element 106 cooperating with a graduated scale 107 which can be readily viewed through the glass 86.

The pointer 106 normally registers with the 0 of such scale, being returned to that position when permitted to do so by the action of the spring 105, any suitable stop being provided to prevent the pointer from passing beyond the 0 position.

In order that the pointer may be temporarily held in its indicating position to show the effect of the brake applied to the wheel undergoing test, the ratchet-wheel 103 is supplied with a pawl 108 fulcrumed at 109, the tail of the pawl having a weight 111 which tends to maintain the pawl in coactive relation with the ratchet-wheel, permitting the latter to turn in one direction, but preventing the turning thereof in the opposite direction.

As has been hereinbefore indicated, the other traction plate 31, through a like mechanism, operates another pointer 112 cooperating with a similar scale 113.

In order to permit the return of the two brake pointers and the single alignment pointer to their original positions automatically under the action of their springs 105 and 76, 77 and 60, respectively, suitable means are required for releasing the three pawls 108, 86, 108, and to this end the following cooperating mechanical instrumentalities have been provided:

A relatively-long yoke 114, pivoted at 115, has a bar portion 116 located just beneath the three ratchet-weights 111, 88, 111, so that, if the yoke is rocked to raise the member 116 and thereby lift the three weights, the pawls will be released from their ratchets, whereby the three pointers 106, 82, and 112 can return at once to their initial 0 positions.

Such rocking of the yoke may be effected manually by a bell-crank lever fulcrumed at 117 (Figure 8), one arm 118 of such lever being connected to a push-rod 119 extended through an end wall of the casing and equipped with a terminal push-knob or button 121, the other arm 122 of the bell-crank lever overlying the yoke on the side of its fulcrum pin opposite the bar 116, so that when the button 121 is pushed in the yoke will be rocked to raise the weights and release all of the pawls.

It is desirable or convenient to sound an audible signal when the wheels of the vehicle to be tested first engage the sloping ends of the two plates 31, it being understood that such wheels may run over the plates 31 lengthwise in either direction, so that the chauffeur may be advised of the proper time for his application of the brakes.

Accordingly, under each end of one of the plates 31 an insulated electrical contact 123, 123, is provided, such contacts being connected together by an insulated wire 124, which, in turn, is connected by a wire 125 to one terminal of an electric-bell 126, the companion terminal of which by a wire 127 is joined to one terminal of a battery 128, the opposite terminal thereof being joined by a wire 129 to the plate 31 above the contacts 123, 123.

Therefore, when either end of the plate 31 is depressed by the vehicle-wheel rolling up it, the circuit to the bell is completed by the engagement of the plate 31 with the corresponding contact and the bell rings to advise the driver of the car to apply the brake, and by the time he has so acted, the wheel will be on the main portions of the plates 31 and the resisting power of the brakes of both wheels will be registered in pounds by the movements of the pointers 106, 112 on their scales 107 and 113.

In some cases it is of benefit to form a permanent record of the alignment condition of the wheels and the braking force applied to them, and in order that this may be done in the present device, the following described mechanism has been supplied.

On the hinged door 68 of the casing 67 horizontal guideways 131, 132 (Figure 10) are provided for a sheet-metal slide 133 adapted to demountably accommodate a graduated cardboard or sheet of stiff paper 134, the alignment slide 75 being fitted with a marking pencil 135, the two racks 93, 93, being similarly equipped with their own individual pencils 136, 136, all three pencils being designed and arranged to mark on the card 134 while the latter is traveling horizontally and while the pencils are moving vertically.

The up and down sliding actions of the three pencils will be readily understood from what precedes and the means for moving the slide 133 and its card 134 will now be described.

A shaft 137 (Figures 8, 9 and 11), mounted in the plates 80 and 180, rockingly supports a hub 138 carrying a relatively-long, weighted arm 139 and a double arm 141, the upper end of which is supplied with outstanding pin 142 overlapping the end of the slide 133, the lower end of such arm constituting a catch 143 normally engaged with one arm of the yoke 114 which carries an armature 144 positioned directly above the cores of a pair of properly supported magnets 145, 145.

Figure 8:
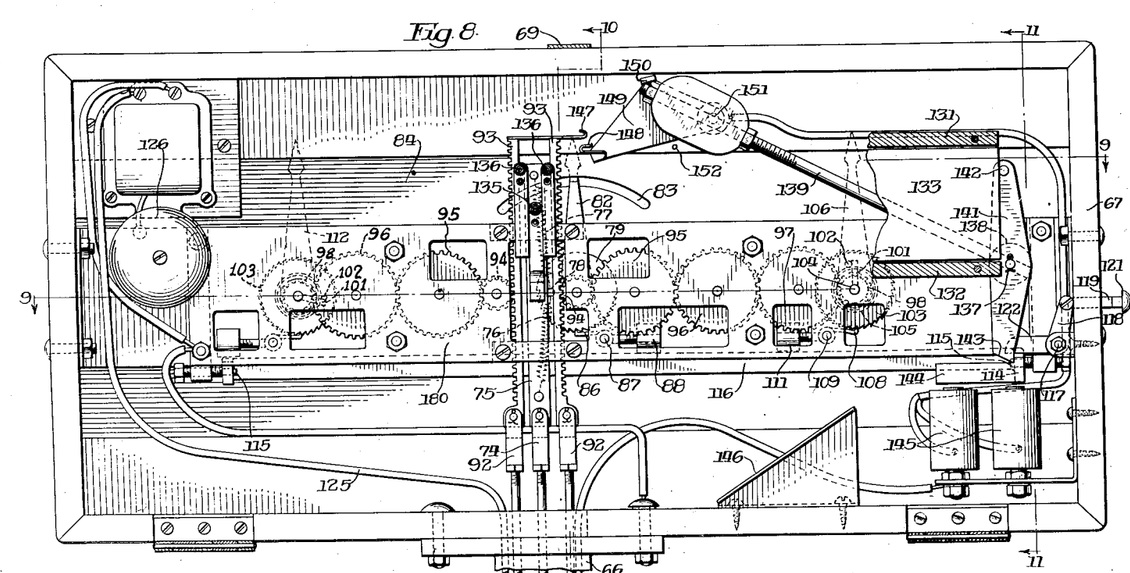
Figure 8 is a vertical section on line 8—8 of Figure 9 through the casing accommodating the indicating and recording alignment and braking mechanism.

Thus, when the magnet is not energized, the weighted arm 139 is held elevated, as shown in Figures 8 and 11, by reason of the engagement of the catch 143 with the side of the yoke.

Figure 9:
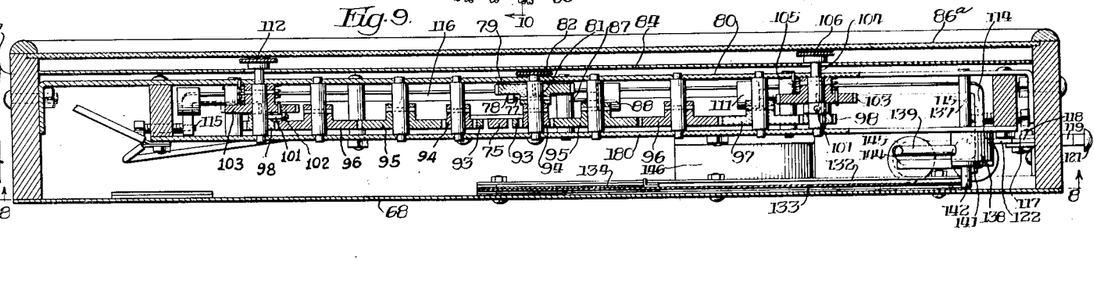
Figure 9 is a horizontal section through the same portion of the apparatus on line 9—9 of Figure 8.

Upon energization of the magnets, the armature 144, fixed to the yoke, is pulled down thereby momentarily releasing the three pawls 86, 108, 108, but also freeing the catch 143 hence allowing the weighted arm 139 to drop against a stop 146, such rocking of the hub 138 turning the arm 141 and causing pin 142 to push the carriage or slide and its contained card 134 along to the left, as the parts are viewed in Figures 8 and 9, a predetermined distance.

In order to thus momentarily energize these magnets to accomplish the stated result, each rack 93 has a flexible electric-contact 147 mounted on its upper end and arranged during its descent to engage another electric-contact 148 mounted on a rock arm 149 oscillatory on a fulcrum pin 151 from which it is electrically insulated.

As soon as such contact is made, it is desirable that the electric-terminal 148 swing downwardly out of the way and, accordingly, the arm 149 is normally held in elevated position by arm 139 due to the engagement of the end of the latter with a projection 150 on the former.

Accordingly, as soon as the contact is made by either one of the elements 147 with member 148, the magnets are energized, the arm 139 falls and thereby permits the arm 149 to rock down against a stop-pin 152, in which position the contact 148 is out of the path of travel of the companion contacts 147.

Figures 5, 6, 7, 13:
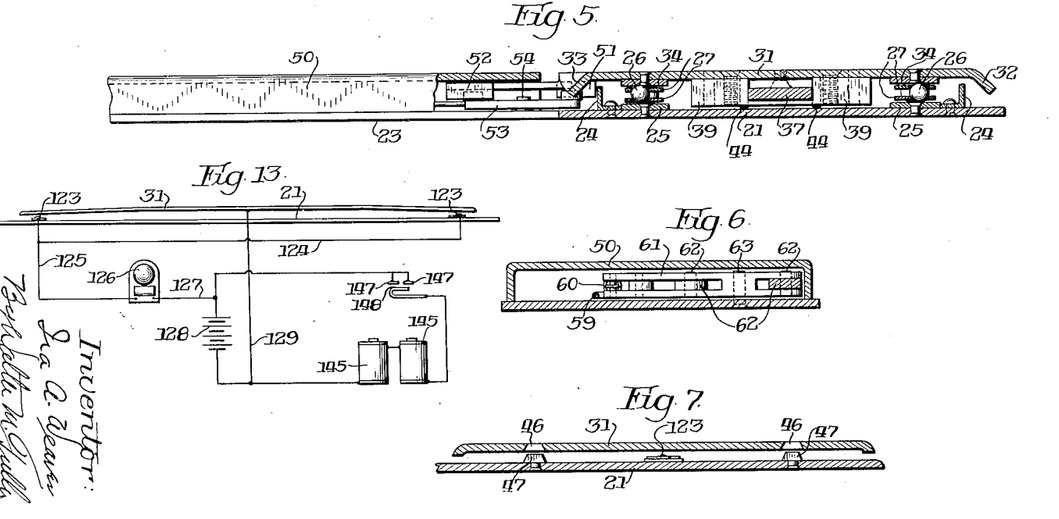
Figure 5 is a fragmentary, vertical cross-section on a larger scale on line 5—5 of Figure 2.
Figure 6 is a lengthwise, vertical section on line 6—6 of Figure 2.
Figure 7 is a cross-section on line 7—7 of Figure 2.
Figure 13 is a diagram of the electrical circuits.

The diagram of the wiring for these magnets is shown in Figure 13 and will be readily understood from the description already presented.

Referring to the record shown on the card 134 in Figure 12, this represents the results of testing the alignment of the wheels and the brakes of an automobile having rear wheel brakes only.

The point 153 sets forth the initial position of the alignment pencil 135, and the points 154 and 155, the first positions of the brake pencils 136, 136, the horizontal distance between the points 154, 155 corresponding to the space between the pair of pencils 136, 136, which are at the same elevation, (see Figure 8), the distance between the points 154, 155 and the single point 153 agreeing with the difference in levels between the complemental pencils when they are all in their original or normal positions.

When the front wheels of the car ran over the plates, the card 134 did not move, because that travels only when the brakes are undergoing test, the magnet circuit being closed solely when one or both racks of the brake testing mechanism descend.

During such travel of the front wheels, the pencil 135 made the short vertical line 156 corresponding to the degree of toe in of such wheels, as shown on scale 157.

If such front wheels had neither in nor out toe, the alignment pencil would have remained stationary and the card would show only the point 153.

When the rear wheels rolled over the traction-plates 31, 31, and the brakes applied during such travel, all three pencils operated for the period of the sliding movement of the record card.

During that time alignment line 158 was traced, showing by its up and down range a certain degree of out toe of the wheels requiring correction, since rear wheels are supposed to run exactly true with neither in nor out toe.

At the same time line 159 was drawn by one of the brake pencils specifying a braking effect on the corresponding wheel of about 350 pounds.

Simultaneously, line 161 was produced on the card by the companion brake pencil indicating a braking action on the corresponding rear wheel of 500 pounds.

Obviously, from this record, if the in toe of the front wheels is excessive it should be rectified, the out toe of the rear wheels should be eliminated and the brake of at least one rear wheel and possibly of both such wheels should be adjusted to give both the same adequate braking performance.

From the antecedent description, it will be clear, that by merely driving the wheels of an automobile lengthwise over the top, parallel plates of this novel and improved appliance, with an application of the brakes by the operator upon the corresponding sounding of the bell, both a visual indication of the condition of the wheels, both as to alignment and braking function, is produced by the several pointers and a permanent record of such status of the wheels is made on the card, which, when removed from the casing, may be preserved if desired.

Manifestly, if the front wheels are also equipped with brakes, they are made operative as the wheels roll along the plates and a record of their condition can be made.

With such a four-wheel brake car, it is preferable to use two record cards 134, one for the front wheels and one for the rear wheels, the squares, 162, 163, being supplied on the card for marks to indicate which set of wheels the car record corresponds to.

Inasmuch as the record card travels or slides along at a definite, predetermined speed, the length of the figure traced by either brake pencil specifies approximately the speed of the vehicle when the brake test was made and this can be ascertained from the speed scale 164.

After one record card has been completed, the operator pushes in the handle 121 to free all of the ratchet-wheels and to permit their pointers to return automatically to 0 position, and he also elevates the weighted arm 139 which rocks the contact 148 upwardly in which raised positions the two elements are held by the engagement of the bevelled catch 143 with the yoke member 114, whereupon the appliance is ready to make another record as soon as a new card has been put in the slide and the back door closed to bring the card into cooperative relation with the tracing pencils.

In the foregoing a single embodiment of the invention has been presented, but those skilled in this art will readily understand that this invention, as defined by the appended claims, is not limited or restricted to such particular embodiment and many more or less radical modifications may be made in the structure without departure from the principles of the invention and without the loss or sacrifice of any of its material benefits.

I claim:

1. In an automobile testing appliance, the combination of a base, and a plate movably mounted with relation to said base and on which the vehicle-wheel of the automobile is adapted to roll to effect the testing action, said base and plate having normally-inactive co-operating means to prevent sidewise movement of the plate with relation to the base, at least a portion of said plate being sufficiently flexible under the weight of the wheel to depress the plate enough to render said co-operating means active to perform their specified function.

2. In an automobile testing appliance, the combination of a base, and a plate movably mounted with relation to said base and on which the vehicle-wheel of the automobile is adapted to roll to effect the testing action, said base and plate having normally-inactive co-operating tapered pin and slot means to prevent sidewise movement of the plate with relation to the base, at least a portion of said plate being sufficiently flexible under the weight of the wheel to depress the plate enough to render said co-operating means active to perform their specified function.

3. In a vehicle-wheel testing appliance, the combination of means mounted to move in a direction having components at right-angles to one another by the rolling contact of a vehicle-wheel therewith, means to resist movement of said means in the direction of one of said components, and means controlled by said first-named means to indicate simultaneously and separately the degree of said two component movements.

4. In a vehicle-wheel testing appliance, the combination of an elongated plate mounted to move simultaneously lengthwise and transversely by the rolling contact of a vehicle-wheel thereon, means to resist lengthwise movement of said plate, and means controlled by said first-named means to indicate simultaneously and separately the degree of said two movements of said plate.

5. In a vehicle-wheel testing appliance, the combination of means mounted to move in a direction having components at right-angles to one another by the rolling contact of a vehicle-wheel therewith, means to resist movement of said means in the direction of one of said components, and means actuated by said movable means to trace said component movements simultaneously on a card.

6. In a vehicle-wheel testing appliance, the combination of a pair of elongated plates on which the opposite wheels of a vehicle are adapted to roll, means to resist the lengthwise movements of said plates, means to indicate separately the forces exerted by the lengthwise travel of said plates effected by the application of brakes to the wheels, equalizing means connecting said plates together to produce equal sidewise movements thereof effected by the in or out toe of the wheels, and means controlled by said plates to indicate such equal sidewise movement thereof.

7. In a vehicle-wheel testing appliance, the combination of a pair of elongated plates on which the opposite wheels of a vehicle are adapted to roll, means to resist the lengthwise movements of said plates, means controlled by said plates to trace on a record card the separate forces exerted by the lengthwise travel of said plates effected by the application of brakes to the wheels, equalizing means connecting said plates together to produce equal sidewise movements thereof effected by the in or out toe of the wheels, and means controlled by said plates to trace said equal sidewise movement on said card.

8. In a vehicle-wheel testing appliance, the combination of a member movable by the rolling contact of a vehicle-wheel thereon when the brake is applied to such wheel, means to resist such movement of said member, means controlled by said member to move a record card, and means controlled by said member to trace the movement of said member on said card during the travel of the latter.

9. In a vehicle-wheel testing appliance, the combination of a member movable by the rolling contact of a vehicle-wheel thereon when the brake is applied to the wheel, means to resist such movement of said member, means to move a record card, means actuated by said wheel on said member to render said card-moving means active, and means controlled by said member to trace the movement of said member on said card during the travel of the latter.

10. In a vehicle-wheel testing appliance, the combination of a member movable by the toe in or toe out of a vehicle-wheel in rolling contact therewith, means controlled by said member to move a record card, and means controlled by said member to trace such movement of said member on said card during the travel of the latter.

11. In a vehicle-wheel testing appliance, the combination of a member movable by the rolling contact of a vehicle-wheel thereon when the brake is applied to such wheel and by the toe in or toe out of said wheel, means to resist the brake-actuated movement of said member, means controlled by said member to move a record card, and means controlled by said member to trace separately both the brake and toe actuated movements of said member on said card during the travel of the latter.

12. In a vehicle-wheel testing appliance, the combination of a member mounted for movement by the rolling contact of a vehicle-wheel thereon when the brake is applied to the wheel, means to resist such movement of said member, means controlled by said member to indicate such movement of said member, and means actuated by the vehicle to give a signal indicating when the brake should be made active.

13. In a vehicle-wheel testing appliance, the combination of a flexible plate adapted to be moved by the rolling contact of a vehicle-wheel thereon when the brake is applied to the wheel, means to resist such movement of said plate, means controlled by said plate to indicate such movement of the plate, and means operated by the flexure of said plate by said wheel to give a signal indicating when the brake should be applied.

14. In a vehicle-wheel testing appliance, the combination of a member movable by a vehicle-wheel traveling thereon when the brake is applied to the wheel, means to resist such movement of said member, means to move a record card at a predetermined speed, means to render said card-moving means automatically active by the movement of said member, and means controlled by said member to trace the travel of said member on said card during the specified movement of the latter.

In witness whereof I have hereunto set my hand.

IRA A. WEAVER.